: US009882611B2

(12) United States Patent
Shi

(10) Patent No.: US 9,882,611 B2
(45) Date of Patent: Jan. 30, 2018

(54) NFC ANTENNA APPLIED TO TERMINAL WITH METAL BACK COVER AND TERMINAL DEVICE THEREOF, BACK COVER FOR TERMINAL DEVICE

(71) Applicant: Huizhou Speed Wireless Technology Co., Ltd., Huizhou (CN)

(72) Inventor: Yanmei Shi, Huizhou (CN)

(73) Assignee: Huizhou Speed Wireless Technology Co., Ltd. (CN)

( * ) Notice: Subject to any disclaimer, the term of this patent is extended or adjusted under 35 U.S.C. 154(b) by 120 days.

(21) Appl. No.: 15/139,598

(22) Filed: Apr. 27, 2016

(65) Prior Publication Data

US 2016/0315669 A1    Oct. 27, 2016

(30) Foreign Application Priority Data

Apr. 27, 2015   (CN) .......................... 2015 2 0258589

(51) Int. Cl.
*H01Q 1/24*    (2006.01)
*H01Q 1/22*    (2006.01)
*H04B 5/00*    (2006.01)
*H01Q 13/10*   (2006.01)
*H01Q 7/00*    (2006.01)

(52) U.S. Cl.
CPC ............. *H04B 5/0081* (2013.01); *H01Q 1/22* (2013.01); *H01Q 1/2225* (2013.01); *H01Q 1/243* (2013.01); *H01Q 7/00* (2013.01); *H01Q 13/10* (2013.01); *H01Q 13/106* (2013.01)

(58) Field of Classification Search
CPC .......... H01Q 1/48; H01Q 1/22; H01Q 1/2225; H01Q 1/243; H01Q 13/10; H01Q 13/106
See application file for complete search history.

(56) References Cited

U.S. PATENT DOCUMENTS 8,922,438 B2 *  12/2014  Nakano ................ H01Q 1/2225
                                                        343/702
2015/0009077 A1 *  1/2015  Lee ........................ H01Q 1/243
                                                        343/702

* cited by examiner

*Primary Examiner* — Hoang Nguyen
(74) *Attorney, Agent, or Firm* — Lerner, David, Littenberg, Krumholz & Mentlik, LLP

(57) ABSTRACT

The present invention discloses an NFC antenna comprising a back cover mounted on a back portion of a terminal and an NFC coil placed inside the terminal. The back cover comprises a metal area and a nonmetal area positioned at an upper portion of the metal area. A middle portion of a junction between the metal and nonmetal areas is provided with a slot extending from top to bottom for a certain length. A metal strip protruding through the nonmetal area from inside to outside is disposed in the nonmetal area at an upper portion of the slot. An NFC feed coil is disposed below the slot. Both ends of a bottom portion of the metal strip are connected with the NFC feed coil, such that a loop circuit is formed between the metal strip and the NFC feed coil and an NFC signal is produced at the metal area.

18 Claims, 5 Drawing Sheets

NFC ANTENNA APPLIED TO TERMINAL WITH METAL BACK COVER AND TERMINAL DEVICE THEREOF, BACK COVER FOR TERMINAL DEVICE

TECHNICAL FIELD

The present invention relates to the field of an antenna and a terminal using the same, and more particularly, to a terminal with a metal back cover and an NFC antenna applied to the terminal.

BACKGROUND

A Near Field Communication (NFC) technology is used for short-range contact communications based on Radio Frequency Identification (RFID), and the communications are achieved by magnetic field coupling between electrical appliances. An NFC payment system is increasingly becoming popular as a novel payment manner. A reader-writer communicates with a tag to realize a single payment. Each of the reader-writer and the NFC tag includes an IC chip for processing a signal and an antenna for transmitting or emitting the signal. Instruction information is transmitted by a magnetic field between NFC coil antennae between the reader-writer and the tag. A short-range high-frequency wireless communication technology ensures that data exchange is realized between two devices over a short range, (the data exchange is realized just over a few decimeters). Because such communication range is relatively short, the NFC payment is safer.

As a mobile phone and a short-range payment become popularized, NFC has been implemented in a mobile device for many performances, and NFC can realize communication by touching a communication or only placing two NFC apparatuses in close proximity to each other. It is used for short-range information processing, data exchange or setting the corresponding configuration of the mobile phone. For example, by storing credit card information and the like, a wireless payment system can accomplish a communication via a virtual wallet by using a touch or short-range communication manner. NFC can also serve as a bootstrap program to set other wireless communications such as Bluetooth. However, since a metal back cover is relatively attractive and durable, a growing number of mobile phones tend to use a metal back cover. However, for an NFC antenna, the metal back cover, especially a full-metal back cover, will block a signal from a magnetic field. The prior art is undesirable in communication when being applied to a mobile phone terminal with the full-metal back cover, and is poor in communication distance and stability.

Recently, many research institutions focus on research and development of NFC antenna with a metal back cover, and obtain a lot of achievements. For example, a slot is opened in the metal back cover, and an NFC coil is placed below it, a current distribution opposite to the coil is formed on the metal back cover by coupling the NFC coil and the metal back cover, such that the metal back cover generates radiation, in short, the metal back cover serves as a signal enhancement antenna, thereby achieving a function of enhancing an antenna performance. By means of a manner of opening the slot in the metal back cover, a corresponding surrounding current is produced around the slot in the back cover, but no current exists in a nonmetal area above the slot.

SUMMARY OF THE PRESENT INVENTION

In view of the above, a problem to be addressed by the present invention is to provide an NFC antenna applied to a terminal with a metal back cover, with a relatively long NFC signal induction range and a relatively strong stability, as well as a terminal device of the NFC antenna, and a back cover for the terminal device.

In order to address the above problems, the present invention provides the following technical solution: An NFC antenna applied to a terminal with a metal back cover comprises the back cover of the terminal, wherein the back cover of the terminal comprises a metal area and a nonmetal area positioned at an upper portion of the metal area, a via exists in the metal area, and a slot enables a notch of the via to extend to an edge of the metal area, and a metal strip, which is close to the edge of the metal area of the slot, is pre-embedded in the nonmetal area;

A power supply coil, which is disposed inside the metal area, and coupled with the metal via; the power supply coil is of a spiral winding form; a winding center is aligned to a center of the metal via, and a track of the power supply coil is connected into the metal strip pre-embedded in the nonmetal area.

The metal strip is placed in parallel to the edge of the metal area.

A clearance between the metal strip and the edge of the metal area is greater than or equal to 0.5 mm.

A length of the metal strip is equal to a side length of the rectangular power supply coil.

The power supply coil is of a conventional spiral winging form, and an inner diameter of winding is greater than the metal via; two access points are taken at the track, which is orthogonal to the slot, at the outermost side of the power supply coil to connect the metal strip in parallel into the wound coil.

The via serves as a camera via or fingerprint identifying via disposed in the back cover for the terminal.

A terminal device, comprising the above NFC antenna applied to a terminal with a metal back cover.

It further comprises other near-field antenna components.

A back cover for a terminal device, comprising the above NFC antenna applied to a terminal with a metal back cover.

Compared with the prior art, the present invention has the following advantageous effects:

The metal strip is pre-embedded in a plastic area outside the metal back cover, and is connected into a conductor circuit of a near-field communication coil; on the basis of coupling an original coil to the metal back cover, the pre-embedded metal strip directly derives a signal current out of a metal shielding area, and coupling between the metal strip and the edge of the metal back cover is increased.

A slit formed between the pre-embedded metal strip and the edge of the metal back cover serves as a newly-increased coupling current distribution area, which greatly increases a current density and a total charge value that the near-field communication coil is directly coupled to the metal back cover, and significantly improves an overall near-field communication function.

A camera module may be held in the via provided below the slot, such that an NFC feed coil may be placed in combination with the camera module, which saves a design space and seemingly shows an associative perception.

DETAILED DESCRIPTION

For easy understanding of a content of the present invention by those skilled in the art, the content of the present invention will be further described below in combination with accompanied drawings and embodiments.

Figure 1:
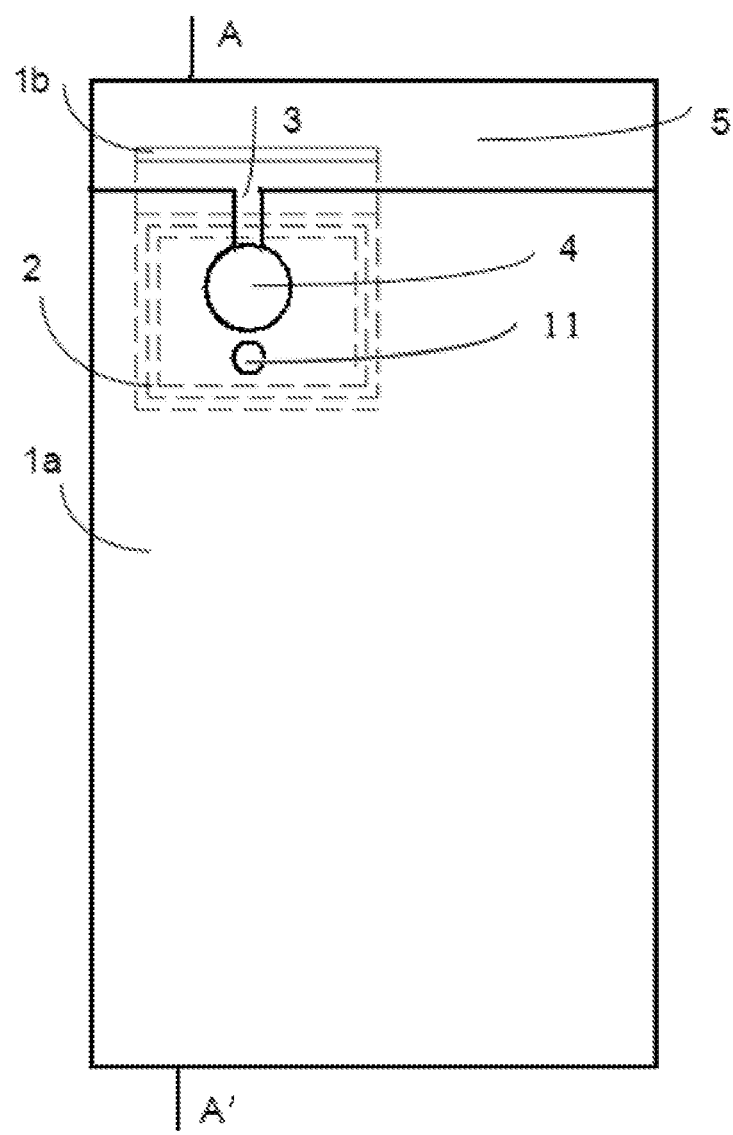
FIG. 1 is an overall structural schematic diagram of an embodiment of an NFC antenna according to the present invention.

FIG. 1 shows an exemplary embodiment of the present invention, comprising a back cover and an NFC feed coil 2, wherein the back cover is divided into two portions, the upper portion is a nonmetal area 5 and the lower portion is a metal area 1a. A boundary line is formed at a junction of the nonmetal area 5 and the metal area 1a. A slot 3 extending from top to bottom from the boundary line is disposed at a middle portion of the boundary line. Two sides of the slot 3 are parallel to each other, and the slot 3 can be filled with a nonmetallic material and forms a whole with the nonmetal area. The slot 3 in the nonmetal area 1a is configured to couple with the NFC feed coil 2 placed at a lower portion of the slot 3 to produce resonance. Preferably, a lower end of the slot 3 is provided with a via 4, the slot 3 may be connected or disconnected with the via. This via 4 is variable in shape (may be square or rectangular), and is mainly configured to add a camera module. A flash lamp module is disposed in a via 11 below a camera. The NFC feed coil 2 is disposed at peripheries of the camera and the flash lamp module, and wound around this module. A metal strip 1b parallel to an edge of the metal area 1a is provided in the nonmetal area 5 at an upper portion of the slot 3. This metal strip 1b protrudes through the nonmetal area 5 from inside of the terminal.

Figure 2:
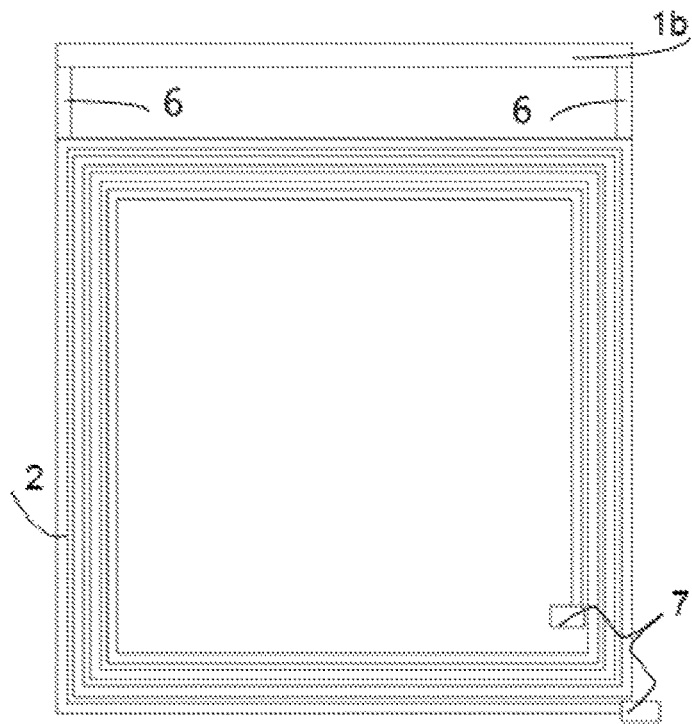
FIG. 2 is a structural schematic diagram showing how an NFC feed coil and a metal strip of an embodiment of an NFC antenna are connected according to the present invention.

As shown in FIG. 2, both ends of the bottom of the metal strip 1b are connected to the NFC feed coil 2 by a conductor 6, and the metal strip 1b and the NFC feed coil 2 are connected to form a loop circuit.

Figure 3:
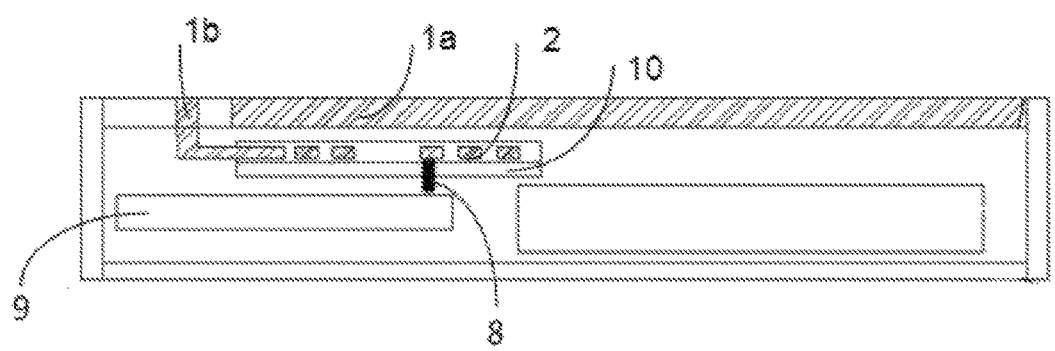
FIG. 3 is a cross-sectional configuration of an embodiment of a terminal device according to the present invention.

FIG. 3 is a cross-sectional configuration of a terminal device applying an NFC antenna technology. A PCB 9 is disposed at a lower portion of the NFC feed coil 2, and a connecting end 7 of the NFC feed coil 2 is connected to a matching circuit on the PCB by a shrapnel 8 to control feed of the coil 2. A medium layer 10 is disposed between the NFC feed coil 2 and the PCB 9 so as to prevent the NFC feed coil 2 from being affected by an electronic element on the PCB 9.

In this embodiment, preferably, the slot 3 has a length of 3-5 mm and a width of 1-3 mm if the via 4 is additionally provided at a lower end of the slot 3. Preferably, the slot 3 has a length of 5-7 mm and a width of 1-3 mm if an elongated slot 3 is only provided. However, the length of the metal strip 1b is equal to that of one side of the NFC feed coil 2. The slot between the metal strip and the edge of the metal area has a width of 0.5-1.5 mm. As such, an NFC coil inside the NFC feed coil is coupled with the slot 3 on the metal area 1a, and the metal strip 1b of the nonmetal area is coupled with the edge of the metal area 1b, which is parallel to the metal strip 1b, so as to form a "T"-shaped coupling area, the coupling area is increased, a coupling current on a surface of the metal area 1a is increased therewith, and thus a relatively strong NFC communication signal is produced. an NFC signal resonance is formed by the NFC feed coil 2 in combination with the metal area 1a, the slot 3 on the metal area 1a, and the metal strip 1b, and a relatively strong NFC communication signal is generated.

Figure 4:
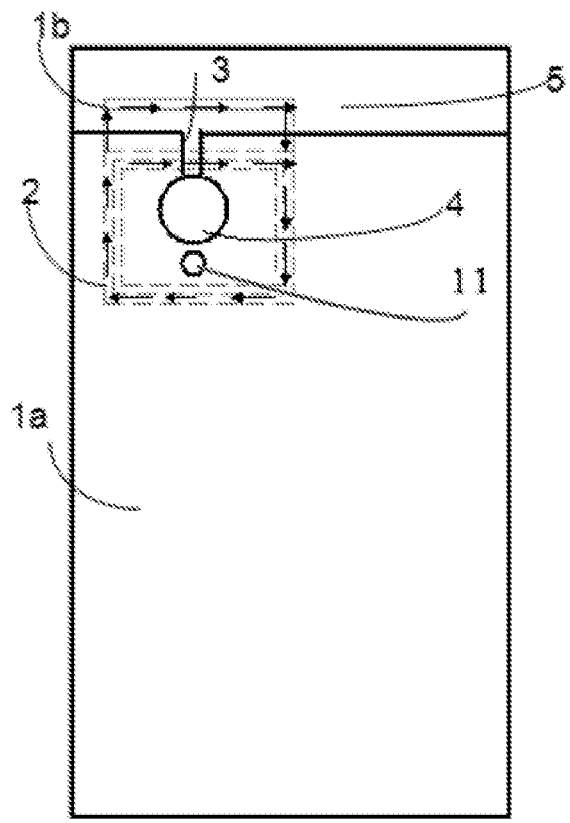
FIG. 4 is a schematic diagram showing a flowing trend of a current in an NFC feed coil of an embodiment of an NFC antenna according to the present invention.
Figure 5:
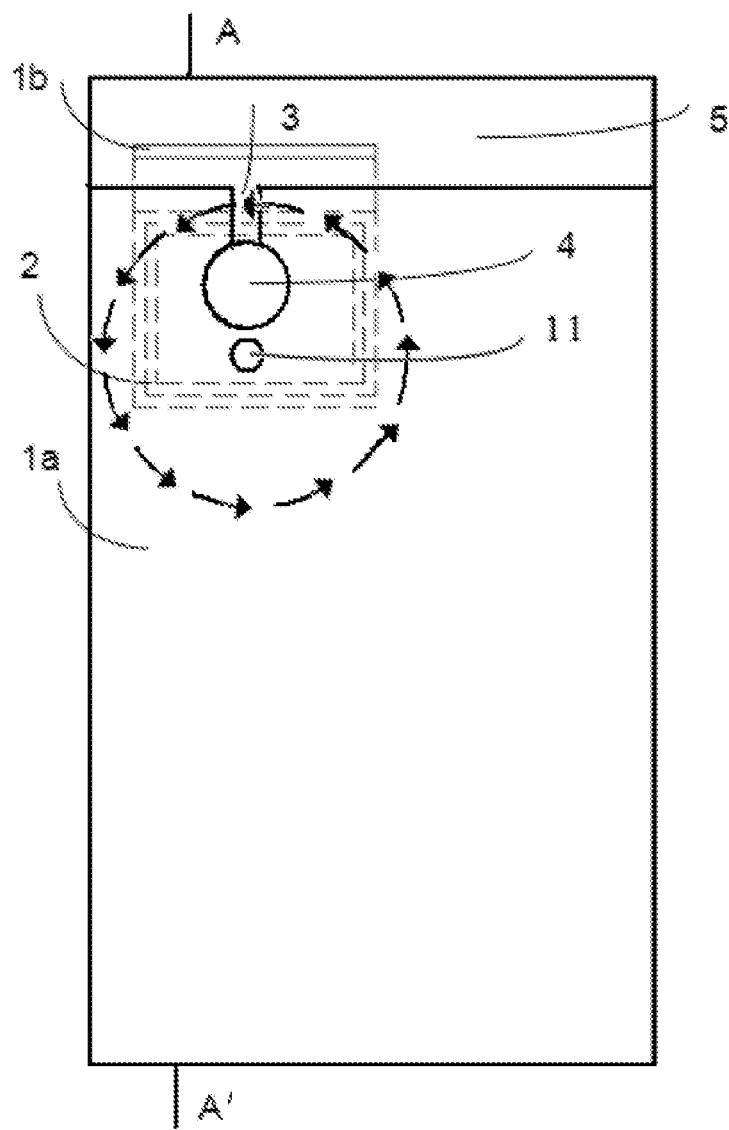
FIG. 5 is a schematic diagram showing a flowing trend of a magnetic flux generated by an NFC antenna according to the present invention.
Figure 6:
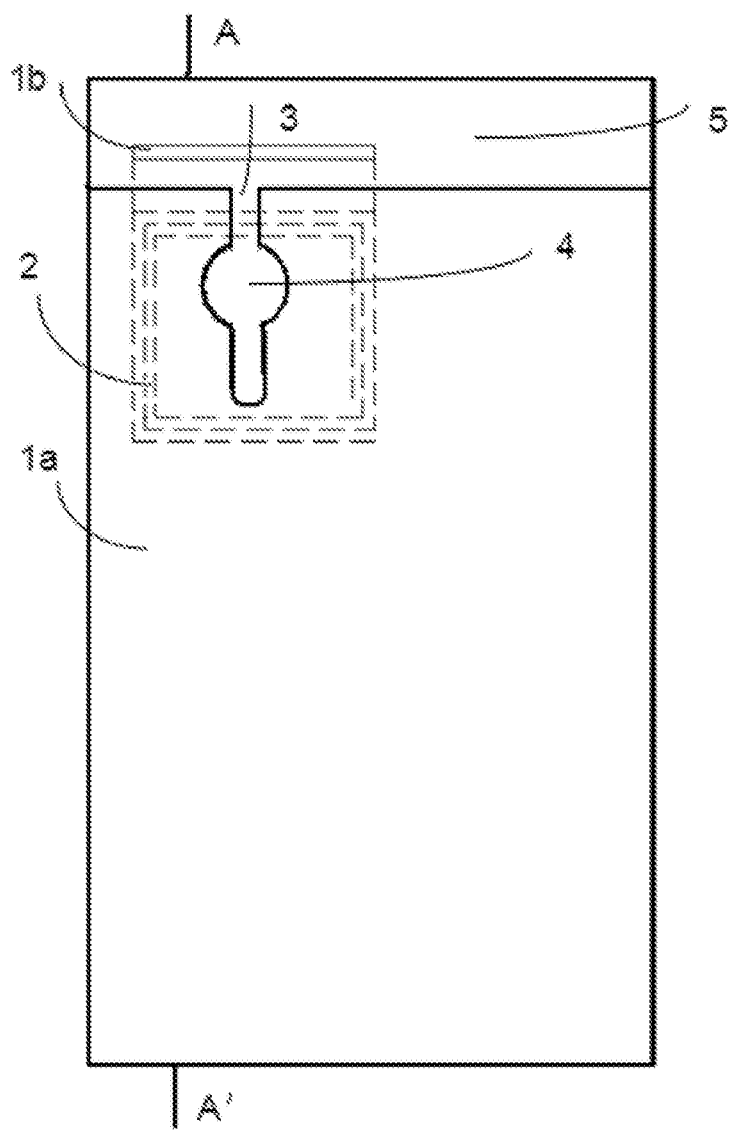
FIG. 6 is an overall structural schematic diagram of another embodiment of an NFC antenna according to the present invention.

As shown in FIG. 4 to FIG. 5, during working, a current signal flows from the matching circuit of the PCB 9 into the NFC feed coil 2, and the current signal in the NFC feed coil 2 flows through the metal strip 1b through a conductor 6, and forms a loop circuit together with the metal strip 1b. The NFC feed coil 2 is wound around an aperture of a camera, and therefore all magnetic fluxes produced by the coil 2 can be linked with the metal back cover, and a current with a direction opposite to that of a current of the NFC feed coil can be produced on the metal back cover. The current produced on the metal back cover is distributed along an area of the slot to form a closed loop circuit, as shown in FIG. 5. The current is distributed as follows: the current is relatively large in the slot of the main metal area, and is gradually decreased in an edge of a mobile phone. The width of the slot between the metal strip and the metal area 1a of the back cover affects a coupling strength. When the width of the slot increases, the coupling strength will decrease. In general, the width of the slot is 1.5 mm, which is a preferred width of the slot.

In addition, the slot 3 may be downwards connected with the camera module and the flash lamp module, such that the whole longitudinal coupling area is increased, and a transverse coupling area is kept unchangeable. The coupling area between the antenna and the metal back cover is increased, the magnetic flux passing through the slot is relatively increased, and the coupling current is increased.

Data in the following table 1 is obtained in this embodiment by a Mini Power:

| | Minipower Test | | | | | | | |
|---|---|---|---|---|---|---|---|---|
| | Listener 1 | | | Listener 3 | | | Listener 6 | |
| Position | 1 Result | 2 Result | Position | 1 Result | 2 Result | Position | 1 Result | 2 Result |
| (0, 0, 0) | 4.29 | 4.66 | (0, 0, 0) | 5.45 | 5.69 | (0, 0, 0) | 5.56 | 4.48 |
| (0, 1, 0) | 4.59 | 4.69 | (0, 1, 0) | 5.47 | 5.68 | (0, 1, 0) | 5.58 | 4.51 |
| (0, 1, 1) | 4.55 | 4.77 | (0, 1, 1) | 5.41 | 5.68 | (0, 1, 1) | 4.91 | 5.29 |
| (0, 1, 2) | 4.52 | 4.67 | (0, 1, 2) | 5.45 | 5.74 | (0, 1, 2) | 5.09 | 4.47 |
| (0, 1, 3) | 1.24 | 4.54 | (0, 1, 3) | 5.58 | 5.59 | (0, 1, 3) | 4.64 | 4.4 |
| (1, 0, 0) | 4.11 | 4.56 | (1, 0, 0) | 4.92 | 5.29 | (1, 0, 0) | 5.98 | 5.81 |

-continued

| Minipower Test | | | | | | | | |
|---|---|---|---|---|---|---|---|---|
| Listener 1 | | | Listener 3 | | | Listener 6 | | |
| Postion | 1 Result | 2 Result | Postion | 1 Result | 2 Result | Postion | 1 Result | 2 Result |
| (1, 1, 0) | 4.15 | 4.55 | (1, 1, 0) | 4.89 | 5.24 | (1, 1, 0) | 5.98 | 5.76 |
| (1, 1, 1) | 4.02 | 4.48 | (1, 1, 1) | 4.49 | 4.79 | (1, 1, 1) | 5.77 | 5.49 |
| (1, 1, 2) | 4.04 | 4.55 | (1, 1, 2) | 4.71 | 5.26 | (1, 1, 2) | 5.15 | 5.52 |
| (1, 1, 3) | 4.2 | 4.62 | (1, 1, 3) | 5.11 | 5.49 | (1, 1, 3) | 5.95 | 5.79 |
| (1, 2, 0) | 4.14 | 4.49 | (1, 2, 0) | 4.6 | 4.82 | (1, 2, 0) | 5.08 | 5.79 |
| (1, 2, 1) | 5.87 | 4.26 | (1, 2, 1) | 5.24 | 5.25 | (1, 2, 1) | 0.98 | 1.19 |
| (1, 2, 2) | 5.76 | 4.47 | (1, 2, 2) | 5.69 | 4.77 | (1, 2, 2) | 2.1 | 2.15 |
| (1, 2, 3) | 4.2 | 4.65 | (1, 2, 3) | 5.57 | 5.69 | (1, 2, 3) | 5.78 | 5.81 |

Data in the following tables 2-3 is obtained in this embodiment by a Load Modulation test:

| Load Modulation Test | | | | | |
|---|---|---|---|---|---|
| Poller 6 TypeA | | | Poller 6 TypeA | | |
| Postion | 1 Result | 2 Result | Postion | 1 Result | 2 Result |
| (0, 0, 0) | 44.1 | 43 | (0, 0, 0) | 41.7 | 50.1 |
| (0, 1, 0) | 39.7 | 39.5 | (0, 1, 0) | 37.8 | 45.6 |
| (0, 1, 1) | 38.2 | 38.5 | (0, 1, 1) | 31.1 | 44.2 |
| (0, 1, 2) | 35 | 37.9 | (0, 1, 2) | 34.5 | 42.5 |
| (0, 1, 3) | 47.6 | 42.4 | (0, 1, 3) | 49.5 | 47 |
| (1, 0, 0) | 39.9 | 36.4 | (1, 0, 0) | 41.3 | 47.6 |
| (1, 1, 0) | 37.9 | 38.3 | (1, 1, 0) | 40.3 | 49.2 |
| (1, 1, 1) | 19.3 | 21.1 | (1, 1, 1) | 21.5 | 26.9 |
| (1, 1, 2) | 20.3 | 25 | (1, 1, 2) | 32.4 | 29.6 |
| (1, 1, 3) | 46.8 | 36.4 | (1, 1, 3) | 47 | 44.6 |
| (1, 2, 0) | 27.7 | 37.6 | (1, 2, 0) | 29 | 46.2 |
| (1, 2, 1) | 7.9 | 12.3 | (1, 2, 1) | 9.9 | 22.1 |
| (1, 2, 2) | 6.3 | 16.8 | (1, 2, 2) | 16.4 | 11.9 |
| (1, 2, 3) | 47.2 | 33.2 | (1, 2, 3) | 46.5 | 37.4 |

| Load Modulation | | | | | | | | | | | |
|---|---|---|---|---|---|---|---|---|---|---|---|
| Poller 0 TypeA | | | Poller 0 TypeB | | | Poller 3 TypeA | | | Poller 3 TypeB | | |
| Postion | 1 Result | 2 Result | Position | 1 Result | 2 Result | Postion | 1 Result | 2 Result | Postion | 1 Result | 2 Result |
| (0, 0, 0) | 31 | 37.6 | (0, 0, 0) | 31.3 | 39.9 | (0, 0, 0) | 21.6 | 32.8 | (0, 0, 0) | 21.7 | 33.8 |
| (0, 1, 0) | 31.2 | 39.3 | (0, 1, 0) | 31.7 | 40.2 | (0, 1, 0) | 21.9 | 32.1 | (0, 1, 0) | 21.7 | 33.4 |
| (0, 1, 1) | 34.1 | 38.9 | (0, 1, 1) | 34.6 | 40.9 | (0, 1, 1) | 34.3 | 33.9 | (0, 1, 1) | 23.9 | 34.8 |
| (0, 1, 2) | 31.3 | 36.9 | (0, 1, 2) | 31.7 | 40 | (0, 1, 2) | 21.4 | 31.9 | (0, 1, 2) | 21.7 | 33.1 |
| (0, 1, 3) | 27.7 | 36.1 | (0, 1, 3) | 27.8 | 38.7 | (0, 1, 3) | 19.5 | 31 | (0, 1, 3) | 19.7 | 31.8 |
| (1, 0, 0) | 37 | 37.7 | (1, 0, 0) | 37.9 | 39.9 | (1, 0, 0) | 27.3 | 33.2 | (1, 0, 0) | 27.3 | 32.7 |
| (1, 1, 0) | 37.3 | 38.5 | (1, 1, 0) | 37.3 | 40.1 | (1, 1, 0) | 27.7 | 32.9 | (1, 1, 0) | 27.7 | 33.7 |
| (1, 1, 1) | 37.7 | 35.1 | (1, 1, 1) | 37.9 | 36.1 | (1, 1, 1) | 27.6 | 27.8 | (1, 1, 1) | 27.5 | 27.8 |
| (1, 1, 2) | 37.4 | 37.8 | (1,1, 2) | 37.2 | 38.8 | (1, 1, 2) | 26.4 | 28.8 | (1, 1, 2) | 26.1 | 39.7 |
| (1, 1, 3) | 35.5 | 40.6 | (1, 1, 3) | 36.3 | 42.4 | (1, 1, 3) | 26.3 | 31.6 | (1, 1, 3) | 25.6 | 32.9 |
| (1, 2, 0) | 38.8 | 40.3 | (1, 2, 0) | 38.2 | 41.3 | (1, 2, 0) | 26.7 | 31.7 | (1, 2, 0) | 26.5 | 32.1 |
| (1, 2, 1) | 35.3 | 30.6 | (1, 2, 1) | 35.5 | 31.2 | (1, 2, 1) | 21.5 | 16.1 | (1, 2, 1) | 21.7 | 16.9 |
| (1, 2, 2) | 37.5 | 37.6 | (1, 2, 2) | 38.4 | 40.3 | (1, 2, 2) | 20.6 | 18.3 | (1, 2, 2) | 21.2 | 20.1 |
| (1, 2, 3) | 34.2 | 41.5 | (1, 2, 3) | 38.3 | 44.4 | (1, 2, 3) | 24.6 | 33 | (1, 2, 3) | 24.2 | 33.6 | wherein, the table 1 shows test data of the prior art, and the table 2 shows test data of this embodiment. As shown in the tables 1-3, most of data on each item of this embodiment are superior to those of the prior art, such that a communication range and a communication quality of the embodiment employing the technical solution are superior to those of the prior art. It can be seen that, by adding the metal strip 1b, a problem that the terminal with the metal back cover has a relatively poor NFC communication quality may be solved, and the NFC communication range of the terminal is improved.

Most of data on practical testing in this embodiment are superior to those of the prior art, such that a communication range and a communication quality of the embodiment employing the technical solution are superior to those of the prior art. It can be seen that, by adding the metal strip 1b, a problem that the terminal with the metal back cover has a relatively poor NFC communication quality may be solved, and the NFC communication range of the terminal is improved.

The foregoing is particular implementations of the present invention, with a relatively particular and detailed description, and should not be construed as limiting the scope of the present invention. It should be noted that, several variations and improvements may be made without departing from the conception of the present invention by those ordinarily skilled in the art, and these obvious alternatives all belong to a protective scope of the present invention.

What is claimed:

1. An NFC antenna applied to a terminal with a metal back cover, comprising a back cover of a terminal, wherein said back cover of said terminal comprises a metal area and a nonmetal area positioned at an upper portion of said metal area, a via exists in said metal area, and a slot enables a notch of said via to extend to an edge of said metal area, and a metal strip, which is close to said edge of said metal area of said slot, is pre-embedded in said nonmetal area;

a power supply coil, which is disposed inside said metal area, and coupled with said metal via; said power supply coil is of a spiral winding form; a winding center is aligned to a center of said metal via, and a track of said power supply coil is connected into said metal strip pre-embedded in said nonmetal area.

2. The NFC antenna applied to a terminal with a metal back cover according to claim 1, wherein said metal strip is placed in parallel to an edge of a metal area.

3. The NFC antenna applied to a terminal with a metal back cover according to claim 2, wherein a clearance between said metal strip and said edge of said metal area is greater than or equal to 0.5 mm.

4. The NFC antenna applied to a terminal with a metal back cover according to claim 3, wherein a length of said metal strip is equal to a side length of a rectangular power supply coil.

5. A terminal device, comprising the NFC antenna applied to a terminal with a metal back cover according to claim 4.

6. The terminal device according to claim 5, further comprising other near-field antenna components.

7. A terminal device, comprising the NFC antenna applied to a terminal with a metal back cover according to claim 3.

8. The terminal device according to claim 7, further comprising other near-field antenna components.

9. A terminal device, comprising the NFC antenna applied to a terminal with a metal back cover according to claim 2.

10. The terminal device according to claim 9, further comprising other near-field antenna components.

11. The NFC antenna applied to a terminal with a metal back cover according to claim 1, wherein a power supply coil is of a conventional spiral winding form, and an inner diameter of winding is greater than a metal via; two access points are taken at a track, which is orthogonal to a slot, at an outermost side of the power supply coil to connect a metal strip in parallel into a wound coil.

12. A terminal device, comprising the NFC antenna applied to a terminal with a metal back cover according to claim 11.

13. The terminal device according to claim 12, further comprising other near-field antenna components.

14. The NFC antenna applied to a terminal with a metal back cover according to claim 1, wherein said via serves as a camera via or fingerprint identifying via disposed in a back cover for a terminal.

15. A terminal device, comprising the NFC antenna applied to a terminal with a metal back cover according to claim 14.

16. The terminal device according to claim 15, further comprising other near-field antenna components.

17. A terminal device, comprising the NFC antenna applied to a terminal with a metal back cover according to claim 1.

18. The terminal device according to claim 17, further comprising other near-field antenna components.

* * * * *